(12) United States Patent
Cohen et al.

(10) Patent No.: US 8,195,710 B2
(45) Date of Patent: Jun. 5, 2012

(54) METHOD FOR SUMMARIZING DATA IN UNAGGREGATED DATA STREAMS

(75) Inventors: Edith Cohen, Berkeley Heights, NJ (US); Nicholas Duffield, Summit, NJ (US); Haim Kaplan, Hod Hasharon (IL); Carsten Lund, Berkeley Heights, NJ (US); Mikkel Thorup, Florence, MA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 228 days.

(21) Appl. No.: 12/653,831

(22) Filed: Dec. 18, 2009

(65) Prior Publication Data

US 2011/0153554 A1  Jun. 23, 2011

(51) Int. Cl.
*G06F 17/00* (2006.01)
(52) U.S. Cl. ........ 707/802; 707/601; 707/602; 707/603; 707/604; 707/661; 707/674; 707/758; 707/781; 707/791
(58) Field of Classification Search .................. 707/601, 707/602, 603, 604, 610, 640, 661, 674, 758, 707/781, 791, 802, 999.101, 999.102, 999.103
See application file for complete search history.

(56) References Cited

OTHER PUBLICATIONS

Author: Edith Cohen Title: sketching unaggregated data stream for subpopulation-size queries date: Jun. 11-13, 2007 Pertinent pp. 10.*
Author: Edith Cohen Title: tighter estimation using bottom K sketches date: Aug. 23-28, 2008 Pertinent pp. 17.*
Author: Edith Cohen Title: bottom-K sketch: better and more efficient estimation of aggregate date: Jun. 12-16, 2007 Pertinent pp. 2.*
Author: Edith Cohen Title: algorithms and estimators for accurate summarization of Internet traffic date: Oct. 24-26, 2007 Pertinent pp. 14.*
Author: Nick Duffield Title: priority sampling for estimation of arbitrary subset sums date: Dec. 2007 Pertinent pp. 36.*

* cited by examiner

*Primary Examiner* — Syling Yen

(57) ABSTRACT

A method for producing a summary A of data points in an unaggregated data stream wherein the data points are in the form of weighted keys (a, w) where a is a key and w is a weight, and the summary is a sample of k keys a with adjusted weights $w_a$. A first reservoir L includes keys having adjusted weights which are additions of weights of individual data points of included keys and a second reservoir T includes keys having adjusted weights which are each equal to a threshold value τ whose value is adjusted based upon tests of new data points arriving in the data stream. The summary combines the keys and adjusted weights of the first reservoir L with the keys and adjusted weights of the second reservoir T to form the sample representing the data stream upon which further analysis may be performed. The method proceeds by first merging new data points in the stream into the reservoir L until the reservoir contains k different keys and thereafter applying a series of tests to new arriving data points to determine what keys and weights are to be added to or removed the reservoirs L and T to provide a summary with a variance that approaches the minimum possible for aggregated data sets. The method is composable, can be applied to high speed data streams such as those found on the Internet, and can be implemented efficiently.

14 Claims, 7 Drawing Sheets

METHOD FOR SUMMARIZING DATA IN UNAGGREGATED DATA STREAMS

FIELD OF THE INVENTION

The present invention generally relates to methods for summarizing data, and more particularly to methods for producing summaries of unaggregated data appearing, e.g., in massive data streams, for use in subsequent analysis of the data.

BACKGROUND OF THE INVENTION

It is often useful to provide a summary of a high volume stream of unaggregated weighted items that arrive faster and in larger quantities than can be saved, so that only a sample can be stored efficiently. Preferably, we would like to provide a generic sample of a certain limited size that we can later use to estimate the total weight of arbitrary subsets of the data.

Many data sets occur as unaggregated data sets, where multiple data points are associated with each key. The weight of a key is the sum of the weights of data points associated with the key and the aggregated view of the data, over which aggregates of interest are defined, includes the set of keys and the weight associated with each key.

In greater detail, this invention is concerned with the problem of summarizing a population of data points, each of which takes the form of $(k, x)$ where $k$ is a key and $x \geq 0$ is called a weight. Generally, in an unaggregated data set, a given key occurs in multiple data points of the population. An aggregate view of the population is provided by the set of key weights: the weight of given key is simply the sum of weights of data points with that key within the population. This aggregate view would support queries that require selection of sub-populations with arbitrary key predicates.

However, in many application scenarios, it is not feasible to compute the aggregate key weights directly; we describe some of these application scenarios below. In these applications time and processing constraints prohibit direct queries and make it necessary to first compute a summary of the aggregate view over the data points, and then to process the query on the summary. A crucial requirement of such summaries is that they must also support selection of subpopulations with arbitrary key predicates. Since the keys of interest are not assumed to be known at the time of summarization, the summarization process must retain per-key statistical estimates of the aggregate weights.

Turning now to applications of interest, communications networking provides a fertile area for developing summarization methods. In the Internet Protocol (IP) suite, routers forward packets between high speed interfaces based on the contents of their packet headers. The header contains the source and destination address of the packets, and usually also source and destination port number which are used by end hosts to direct packets to the correct application executing within them. These and other fields in the packet header each constitute a key that identifies the IP flow that the packet belongs to. In our context, we can think of the set of keys of packets arriving at the router in some time interval, each paired with the byte size of the corresponding packet, as a population of unaggregated data points.

Routers commonly compile summary statistics on the traffic passing through them, and export them to a collector which stores the summaries and support query functions. Export of the unaggregated data is infeasible due to the expense of the bandwidth, storage and computation resources that would be required to support queries. On the other hand, direct aggregation of byte sizes over all distinct flow keys at a measuring router is generally infeasible at present due the amount of (fast) memory that would be required to maintain and update at line rate the summaries for the large number of distinct keys present in the data Thus some other form of summarization is required.

Common queries for network administrators would include: (i) calculating the traffic matrix, i.e., the weight between source-destination address pairs; (ii) the application mix, as indicated by weight in various port numbers (iii) popular websites, as indicated by destination address using certain ports. Although some queries are routine, in exploratory and troubleshooting tasks the keys of interest are not known in advance.

Other network devices that serve content or mediate network protocols generate logs comprising records of each transaction. Examples include web servers and caches; content distribution servers and caches; electronic libraries for software, video, music, books, papers; DNS and other protocol servers. Each record may be considered as a data point, keyed, e.g., by requester or item requested, with weight being unity or the size or price of the item requested if appropriate. Offline libraries can produce similar records. Queries include finding the most popular items or the heaviest users, requiring aggregation over keys with common user and/or item. Another example is sensor networks comprise a distributed set of devices each of which generates monitoring events in certain categories.

All of these application examples, to a greater or lesser extent, share the feature that the approximate aggregation is subjected to physical resource constraints on the information that can be carried through time or between locations. For example, there are multiple distinct devices that produce data points, and from which information flows to a single ultimate collector and bandwidth is limited. If data points arrive as a data stream, then storage is limited. In the network traffic statistics application, measurements may be aggregated in mediation devices (e.g. one per geographic router center) which in turn export to a central collector. Sensor networks may deploy a large number of sensor nodes with limited capabilities that can collaborate locally to aggregate their measurements before relaying messages more widely. Physical layout aside, when summarizing data that resides on external memory or when exploiting parallel processing to speed up the computation, the computation is subjected to similar data flow constraints imposed by the underlying model.

There has been considerable amount of work in past years devoted to finding efficient data summarization schemes.

Summarizing Aggregated Data. In aggregated data sets, each data point has a unique key. There are many summarization methods for such data sets in the literature that produce summaries that support unbiased estimates for subpopulation weight. Reservoir sampling from a single stream is the base of the stream database of Johnson et. al. [T. Johnson, S. Muthukrishnan, and I. Rozenbaum, SAMPLING ALGORITHMS IN A STREAM OPERATOR, In *Proc. ACM SIGMOD*, pages 1-12, 2005]. Classic algorithms for offline, data streams, and distributed settings include: Weighted sampling with replacement (probability proportional to size) (the k-mins framework) [E. Cohen, SIZE-ESTIMATION FRAMEWORK WITH APPLICATIONS TO TRANSITIVE CLOSURE AND REACHABILITY, *J. Comput. System Sci.*, 55:441-453, 1997; E. Cohen and H. Kaplan, SPATIALLY-DECAYING AGGREGATION OVER A NETWORK: MODEL AND ALGORITHMS, *J. Comput. System Sci.*, 73:265-288, 2007]; the stronger bottom-k framework [E. Cohen and H. Kaplan, BOTTOM-K SKETCHES: BETTER AND MORE EFFICIENT ESTIMATION OF AGGREGATES, In *Proceedings of the ACM SIGMETRICS '07 Conferece*, 2007, poster; E.

Cohen and H. Kaplan, SUMMARIZING DATA USING BOTTOM-K SKETCHES, In *Proceedings of the ACM PODC '07 Conference*, 2007; E. Cohen and H. Kaplan, TIGHTER ESTIMATION USING BOTTOM-K SKETCHES, In *Proceeding of the 34th VLDB Conference*, 2008] that includes priority sampling [N. Duffield, M. Thorup, and C. Lund, Priority sampling for estimating arbitrary subset sums, *J. Assoc. Comput. Mach.*, 54(6), 2007] and the classic weighted sampling with replacement; and the recently-proposed VAROPT [E. Cohen, N. Duffield, H. Kaplan, C. Lund, and M. Thorup, VARIANCE OPTIMAL SAMPLING BASED ESTIMATION OF SUBSET SUMS, In *Proc. 20th ACM-SIAM Symposium on Discrete Algorithms*, ACM-SIAM, 2009] that achieves variance optimality.

These summarizations, however, can not be computed over the unaggregated data unless the data is first aggregated, which is prohibited by application constraints. Firstly, the best estimators for summaries derived from aggregated data utilize the exact weight of each key that is included in the summary. Secondly, the distribution itself of keys that are included in the summary can not be computed under the IFT-constraints. (The only exception is weighted sampling (with or without replacement), but even though we can efficiently determine the keys to include in the summary over the unaggregated data, we need a "second pass" (or another communication round) to obtain the total weight of each included key in order to compute the estimators.)

These methods can be applied to produce data-point-level summaries, by effectively treating each data point as having a unique key. These summaries, however, have large multiplicities of the same key and they are considerably less accurate than key-level summaries. This prompted the development of methods that compute key-level summaries over the unaggregated data.

Summarizing Unaggregated Data. Summarization of unaggregated data sets was extensively studied [N. Alon, Y. Matias, and M. Szegedy, THE SPACE COMPLEXITY OF APPROXIMATING THE FREQUENCY MOVEMENTS, *J. Comput. System Sci.* 58:137-147, 1999; P. Indyk and D. P. Woodruff, OPTIMAL APPROXIMATIONS OF THE FREQUENCY MOMENTS OF DATA STREAMS, In *Proc 37th Annual ACM Symposium on Theory of Computing*, pages 202-208, ACM, 2005; M. Charikar, K. Chen, and M. Farach-Colton, FINDING FREQUENT ITEMS IN DATA STREAMS, In *Proceedings of the International Colloquium on Automata, Languages and Programming (ICALP)*, pages 693-703, 2002; R. Fagin, A. Lotem, and M. Naor, OPTIMAL AGGREGATION ALGORITHMS FOR MIDDLEWARE, In *Proceedings of the 24th ACM Symposium on Principles of Database Systems*, ACM-SIGMOD, 2001; P. Cao and Z. Wang, EFFICIENT TOP-k QUERY CALCULATION IN DISTRIBUTED NETWORKS, In *Proc 23rd Annual ACM Symposium on Principles of Distributed Computing*, ACM-SIGMOD,2004; G. Manku and R. Motwani, APPROXIMATE FREQUENCY COUNTS OVER DATA STREAMS, In *International Conference on Very Large Databases (VLDB)*, pages 346,357, 2002; G. Cormode and S. Muthukrishnan, WHAT'S HOT AND WHAT'S NOT: TRACKING MOST FREQUENT ITEMS DYNAMICALLY, In *Proceeding of ACM Ptinciples of Database Sysems*, 2003] for applications that include data streams, distributed data, and in-network aggregation (sensor networks) [A. Manjhi, S. Nath, and P. B. Gibbons, TRIBUTARIES AND DELTAS: EFFICIENT AND ROBUST AGGREGATION IN SENSOR NETWORK STREAMS, In *SIGMOD* 2005, ACM, 2005]. We are specifically interested in summaries that support estimating the weight of selected subpopulations, specified using arbitrary selection predicates and compare our methods against alternative methods that do that. (We do not consider methods restricted to estimating an aggregate over the full data or geared for different aggregates such as top-k, heavy hitters, or frequency moments of the full data set.)

Concise samples [P. Gibbons and Y. Matias, NEW SAMPLING-BASED SUMMARY STATISTICS FOR IMPROVING APPROXIMATE QUERY ANSWERS, In *SIGMOD*, ACM, 1998] refer to independent sampling of data points (this assumes that data points have uniform weights). The key idea is to combine in the sample all data points with the same key, and therefore obtain a larger effective sample using the same storage. This is also the flow counting mechanism deployed by Cisco's sampled NetFlow (NF) in routers [Cisco NetFlow, described in materials found at www.cisco.com/en/US/docs/ios/12_2sb/feature/guide/sbrsnf.html]. When sampling is performed at a fixed-rate we obtain variable-size summary. In many applications, a fixed-size summary is desirable, which is obtained by adaptively decreasing the sampling rate. We refer to this adaptive version as aNF.

Counting samples [P. Gibbons and Y. Matias, NEW SAMPLING-BASED SUMMARY STATISTICS FOR IMPROVING APPROXIMATE QUERY ANSWERS, In *SIGMOD*, ACM, 1998] (also developed as sample-and-hold (SH) [C. Estan and G. Varghese, NEW DIRECTIONS IN TRAFFIC MEASUREMENT AND ACCOUNTING, In *Proceeding of the ACM SIGCOMM '02 Conference*, ACM, 2002]) is a summarization algorithm applicable to an unaggregated stream of data points with uniform weights. The algorithm samples all data points at a fixed rate, but once a key is sampled, all subsequent data points with the same key are counted. Similarly, there is an adaptive version of the algorithm that produces fixed-size summaries (aSH).

Subpopulation-weight estimators for aSH and aNF have been proposed and evaluated [E. Cohen, N. Duffield, H. Kaplan, C. Lund and M. Thorup, SKETCHING UNAGGREGATED DATA STREAMS FOR SUBPOPULATION-SIZE QUERIES, In *Proc of the 2007 ACM Symp. on Principles of Database Systems (PODS 2007)*, ACM, 2007; E. Cohen, N. Duffield, H. Kaplan, C. Lund and M. Thorup, ALGORITHMS AND ESTIMATORS FOR ACCURATE SUMMARIZATION OF INTERNET TRAFFIC, In *Proceedings of the 7th ACM SIGCOMM conference on Internet measurements (IMC)*, 2007]. aSH dominates aNF on any sub-population and distribution. aNF (and NF), however, are applicable on general IFTs whereas aSH (and SH) are limited to streams. In addition, aSH does not support multiple-objectives unbiased estimation for other additive (over data points) weight functions [E. Cohen, N. Duffield, H. Kaplan, C. Lund, and M. Thorup, ALGORITHMS AND ESTIMATORS FOR ACCURATE SUMMARIZATION OF INTERNET TRAFFIC, MANUSCRIPT, 2007] whereas aNF and our summarization algebra support multiple objectives. aSH is applicable to uniform weights and its extension to general weights does not utilize and benefit from a higher-level of aggregation. For example, in terms of the produced summary and estimate quality, it treats the sequence (i1, 1), (i2, 3), (i1, 2) as (i1,1), (i2,1), (i2,1), (i2,1), (i1,1), (i1,1).

Step-counting SH (sSH) is another summarization scheme for unaggregated data streams that improves over aSH by exploiting the memory hierarchy structure at high speed IP routers. As a pure data stream algorithm, however, sSH utilizes larger storage to produce the same size summary as aSH.

Propagation of Summaries on Trees. Multistage aggregation for threshold sampling [N. G. Dufield, C. Lund, and M. Thorup, LEARN MORE, SAMPLE LESS: CONTROL OF VOLUME AND VARIANCE IN NETWORK MEASUREMENTS, *IEEE Transactions on Information Theory*, 51(5):1756-1775, 2005] is represented on a tree [E. Cohen, N. Duffield, C. Lund, and M. Thorup, CONFIDENT ESTIMATION FOR MULTISTAGE MEASUREMENT SAMPLING AND AGGREGATION, In *ACM SIGMETRICS*, 2008, Jun. 2-6, 2008, Annapolis, Md., USA] for the purpose of developing exponential bounds on summary error. Applications include Sampled NetFlow, Counting Samples, and Sample and Hold. Some earlier work [N. Duffield and C. Lund, PREDICTING RESOURCE USAGE AND ESTIMATION ACCURACY IN AN IP FLOW MEASUREMENT COLLECTION INFRASTRUCTURE, In *ACM SIGCOMM Internet Measurement Workshop,* 2003, Miami Beach, Fla., Oct. 27-29, 2003] had analyzed variance for Sampled NetFlow, exploiting relationships similar to Lemma 8 set forth below for multistage sampling.

From the foregoing discussion, it will be apparent that a summarization method for unaggregated data sets desirably will work on massive data streams in the face of processing and storage constraints that prohibit full processing; will produce a summarization with low variance for accurate analysis of data; will be one that is efficient in its application (will not require inordinate amounts of time to produce); will provide unbiased summaries for arbitrary analysis of the data; and will limit the worst case variance for every single (arbitrary) subset.

The prior art summarization methods described above have been unable to satisfy all of these desiderata.

Accordingly, there is a need to provide a summarization method for unaggregated data that produces results better than those attainable by prior art methods.

BRIEF SUMMARY OF THE INVENTION

We formalize the above physical and logical constraints on the information flow using Information Flow Trees (IFTs). Data points are generated at leaves of the tree and information flows bottom-up from children to parent nodes. Each node in the tree obtains information (only) from its children and is subjected to a constraint on the information it can propagate to its parent node and to its internal processing constraints (that can also be captured by an IFT). For our summarization problem, at each node, IFT constraints prohibit the computation on the full aggregated data presented from it children nodes children. Rather, it combines them into one summary, which is hence a summary of all the data produced by leaf nodes descended from it. The physical and logical constraints translate to an IFT or family of applicable IFTs. Subjected to these constraints, we are interested in obtaining a summary that allows us to answer approximate queries most accurately.

Our summaries are based on adjusted weights which means that both data sets and summaries have a consistent representation as a weighted set: a set of keys with weights associated with each key. We develop a Summarization Algebra for manipulating adjusted-weight summaries. In our framework, summarization and merging of summaries of unaggregated data sets are composable operators that allow us to perform summarization subject to arbitrary IFT constraints and at the same time preserve the good properties of the summarization.

One of the discoveries we have made is that IFT constraints, and the data stream model constraints in particular, prohibit variance-optimal summarization of unaggregated data. This contrasts with what is possible for aggregated data, for which there exists an optimal summarization scheme (VAROPT) that is applicable for data streams and general IFT constraints [M. T. Chao, A GENERAL PURPOSE UNEQUAL PROBABLILITY SAMPLING PLAN, *Biometrika,* 69(3):653-656, 1982; Y. Tillé, AN ELIMINATION PROCEDURE FOR UNEQUAL PROBABILITY SAMPLING WITHOUT REPLACEMENT, *Biometrika,* 83(1):238-241, 1966; Y. Tillé, *Sampling algorithms,* Springer-Verlag, New York, 2006; E. Cohen, N. Duffield, H. Kaplan, C. Lund, and M. Thorup, VARIANCE OPTIMAL SAMPLING BASED ESTIMATION OF SUBSET SUMS, In *Proc. 20th ACM-SIAM Symposium on Discrete Algorithms,* ACM-SIAM, 2009]. On the other hand, we have discovered that by leveraging VAROPT in our method, we can obtain local optimality of intermediate summarization steps and approach variance optimality as the data set becomes "more" aggregated.

In particular, in accordance with the summarization method of the present invention, unaggregated data are summarized by utilizing at summarization points an adjusted weight summarization method that inputs a weighted set of size k+1 and outputs a weighted set of size k (removes a single key). As we discuss below, by including the local application of the VAROPT algorithm, we obtain the desirable properties we seek.

In further aspects of the invention, the summarization is presented using mergins and sampling operations applied to a dataset of weighted keys. The algorithm maintains adjusted weights of keys that are unbiased estimates of their actual weight. The summarization is applied using the same adjusted weights.

In a particular aspect of the invention, a method for producing a summary A of data points in an unaggregated data stream wherein the data points are in the form of weighted keys (a, w) where a is a key and w is a weight, and the summary is a sample of k keys a with adjusted weights $w_a$, comprises providing a first set or reservoir L with keys having adjusted weights which are additions of weights of individual data points of included keys; providing a second set or reservoir T with keys having adjusted weights which are each equal to a threshold value $\tau$ whose value is adjusted based upon tests of new data points arriving in the data stream; and combining the keys and adjusted weights of the first reservoir L with the keys and adjusted weights of the second reservoir T to form the summary representing the data stream. A third reservoir X may advantageously be used for temporarily holding keys moved from reservoir L and for temporarily holding keys to be moved to reservoir T in response to tests applied to new data points arriving in the stream. The method proceeds by first merging new data points in the stream into the reservoir L until the reservoir contains k different keys, and thereafter applying a series of tests to new arriving data points to determine how their keys and weights compare to the keys and adjusted weights already included in the summary.

For example, a first test may determine if the key of the new data point is already included in reservoir L, and if so, to increase the adjusted weight of the included key by the weight of the new data point; a second test may determine if the key of the new data point is already included in reservoir T, and if so, to move the key from reservoir T to reservoir L and to increase the adjusted weight of the included key by the weight of the new data point. If the key of the new data point is not already in included in reservoir T or reservoir L, a third test may determine if the weight of the new data point is greater than the threshold value T and if so, to add the key and weight of the new data point to reservoir L, and if not to add the key of the new data point to temporary reservoir X. Another test may be utilized to determine if the key with the minimum adjusted weight included in reservoir L is to be moved to reservoir X, and a further test based on a randomly generated number may be used to determine keys to be removed from reservoirs T or X. In this fashion, each new data point (the k+1 data point) is used to produce a sample of k keys that faithfully represents the data stream for use in subsequent analysis.

The foregoing method may be used to summarize separate data streams, and their summaries may in turn be summarized using the same method.

Our method supports multiple weight functions. These occur naturally in some contexts (e.g. number and total bytes of a set of packets). They may also be used for derived quantities, such as estimates of summary variance, which can be propagated up the IFT.

We compared our method to state of the art methods that are applicable to IFTs and specifically only to data streams. We found that our methods produce more accurate summaries for a given size, with typically a reduction in variance.

Our method performed very close to the (unattainable) variance optimality, making it a practically optimal summarization scheme for unaggregated data.

Lastly, our method is efficient, using only 0(log k) amortized per step but in practice is much faster, being constant on non-pathological sequences.

The summarization method for unaggregated data of the present invention provides a summarization that is a composable operator, and as such, is applicable in a scalable way to distributed data and data streams. The summaries support unbiased estimates of the weight of subpopulations of keys specified using arbitrary selection predicates and have the strong theoretical property that the variance approaches the minimum possible if the data set is "more aggregated."

The main benefit of the present method is that it provides much more effective summaries for a given allocated size than all previous summarization methods for an important class of applications. These applications include IP packet streams, where each IP flow occurs as multiple interleaving packets, distributed data streams produced by events registered by sensor networks, and Web page or multimedia requests to content distribution servers.

These and other objects, advantages and features of the invention are set forth in the attached description.

BRIEF DESCRIPTION OF THE DRAWINGS

The foregoing summary of the invention, as well as the following detailed description of the preferred embodiments, is better understood when read in conjunction with the accompanying drawings, which are included by way of example and not by way of limitation with regard to the claimed invention:

DETAILED DESCRIPTION OF THE INVENTION

Information-flow trees (IFTs) are graphic tools that may be used to represent both (a) the operations performed and (b) the constraints these operations are subjected to when summarizing an unaggregated data set. An IFT is a rooted tree with a data point at each leaf node (the input). Edges are directed from children to parent nodes and have associated capacities that capture storage or communication constraints that are imposed by the computational setup. Information is passed bottom-up from children nodes to parent nodes, subjected to capacity constraints on edges and processing constraints at each internal node. The processing constraints at each internal node can also be modeled using an IFT (this makes it a recursive structure.) The information contained at each node depends only on the data points at descendent leaves.

Figure 1:
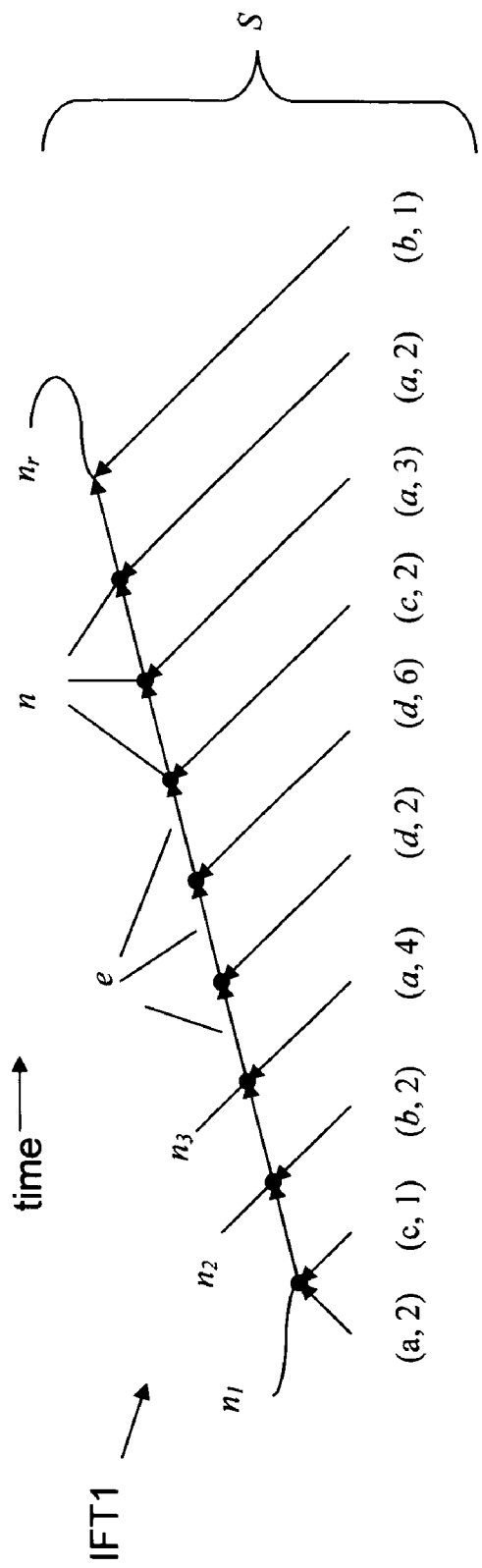
FIG. 1 shows an Information Flow Tree corresponding to data stream model constraints.

The constraints imposed by the data stream model are captured by the IFT1 shown in FIG. 1 that is in the form of a time-advancing path with a single leaf (data point) hanging off each node n. All edges e have the same capacity, which corresponds to the storage limitation when processing the stream. The summarization of data in an exemplary data stream is represented by IFT1 as follows: As shown in FIG. 1, a stream S of data points (k,w) arrives over time with keys a, b, c, d and weights w given by Arabic numbers. The set of data point examples shown in FIG. 1 is given by (a,2), (c,1), etc. The weighted set of this stream is $w(a)=2+3+4=9$; $w(b)=2+1=3$; $w(c)=1+2=3$; $w(d)=2+6=8$. The nodes n in IFT1 output a summary of their prefix. For example, the third node $n_3$ outputs a summary with $w(a)=6$; $w(b)=2$ and $w(c)=1$. The root node $n_r$ provides a summary of the weighted set.

Figure 2:
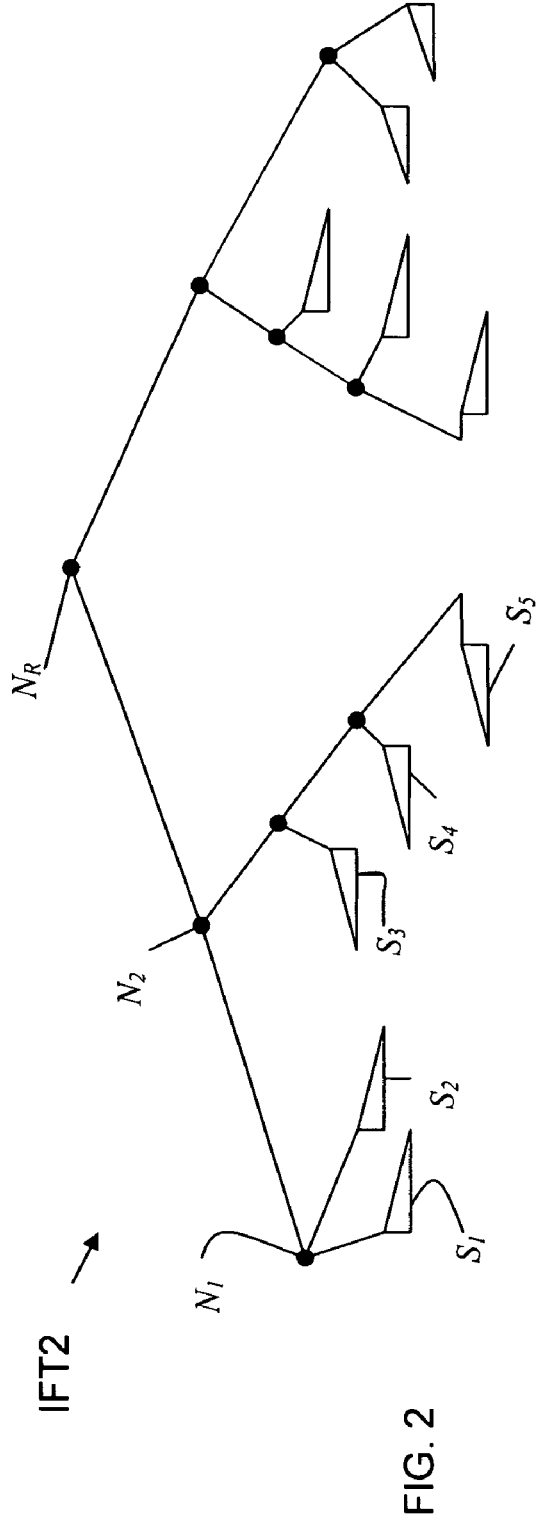
FIG. 2 shows an Information Flow Tree of an aggregation of multiple distributed data streams.

An information flow tree IFT2 for summarization of multiple distributed data streams S1, S2, etc., over some communication network is illustrated in FIG. 2. Edge capacities at each "stream" module S1, S2, etc., capture storage constraints and other edge capacities capture network bandwidth constraints. As shown in FIG. 2, the root node NR of IFT2 outputs a summary of all of the data streams S1, S2, etc, to a processor, e.g., in a server, to perform analysis of the data.

Figure 3:
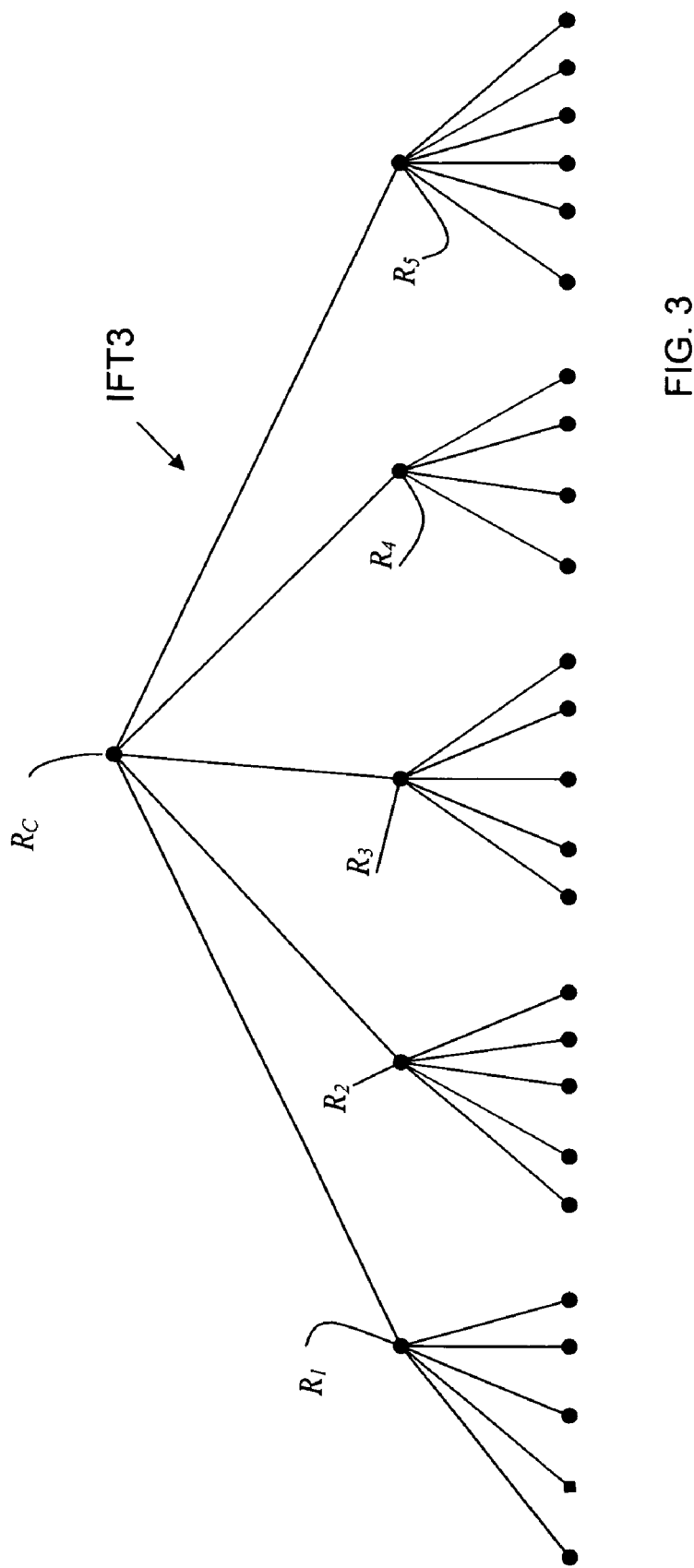
FIG. 3 shows an Information Flow Tree for an aggregation of data from multiple servers sending data to a central server.

FIG. 3 illustrates an information flow tree IFT3 for summarization performed by multiple servers R1, R2, etc., each summarizing a part of the data and sending a summary of their part to a single central server Rc, which produces a summary of the full data set. The IFTs of FIGS. 1-3 may also be used to capture constraints of using multiple parallel processors: The data set is partitioned to separate processors, each processor produces a summary of its own chunk of the data, and these summaries are combined to produce the final output summary.

The summarization methods that take place in IFT1, IFT2 and IFT3 according to the present invention are arranged to summarize unaggregated data subject to the constraints noted above using adjusted-weight summarization, and to use merging and addition steps that advantageously preserve desirable data qualities to provide a resulting data summary in a form that allows us to answer approximate queries with respect to the data most accurately.

Theoretical Background

To understand the data qualities that the present invention seeks to obtain, and how the summarization methods of the present invention achieve these qualities, some definition of terminology and some background explanation is necessary with respect to adjusted-weight summaries and their variances.

A weight assignment w: U is a function that maps all keys in some universe to non-negative real numbers. There is a bijection between weight assignments and corresponding weighted sets, and we use these terms interchangeably.

The weighted set that corresponds to a weight assignment w is the pair (I,w), where $I \equiv I(w) \subset U$ is the set of keys with strictly positive weights. (Thus, w is defined for all possible keys (the universe U) but requires explicit representation only for I.)

A data point (I, x) corresponds to a weight assignment w such that $w(i)=x$ and $w(j)=0$ for $j \neq i$.

In the following description, we include various definitions, theorems, and lemmas, but for simplicity have omitted proofs.

DEFINITION 1. Adjusted-weight summary (AW-summary) of a weight assignment w is a random weight assignment A such that for any key $i \in U$, $E[A(i)]=w(i)$.

AW-summaries support estimating the weight of arbitrary subpopulations: For any subpopulation $J \subset U$, $$\sum_{j \in J} A(j) = \sum_{j \in J | A(j) > 0} A(j)$$

is an unbiased estimate of w(J). Note that the estimate is obtained by applying the selection predicate only to keys that are included in the summary A and adding up the adjusted weights of keys that satisfy the predicate.

Different AW-summaries of the same weighted set are compared based on their size and estimation quality. The size of a summary is the number of keys with positive adjusted weights. The average size of an AW-summary is $E[|\{i|A(i)>0\}|]$. An AW-summary has a fixed size k if it assigns positive adjusted weight to exactly k keys.

Variance is the standard metric for the quality of an estimator for a single quantity, such as the weight of a particular subpopulation. In particular, the variance of A(i) (the adjusted weights assigned to a key i under AW-summary A) is $$VAR_A[i] \equiv VAR[A(i)] = E[(A(i)-w(i))^2] = E[A(i)]^2 - w(i)^2$$

and the covariance of A(i) and A(j) is $$COV_A[i,j] \equiv COV[A(i), A(j)] = E[A(i)A(j)] - w(i)w(j).$$

The variance for a particular subpopulation J is equal to $$\sum_{i,j \in J} COV_A[i,j] = \sum_{i \in J} VAR_A[i] + \sum_{i \neq j, \, i,j \in J} COV_A[i,j].$$

Since AW-summaries are used for arbitrary subpopulations that are not specified a priori, the notion of a good metric is more subtle. There is generally no single AW-summary that dominates all other of the same size on all subpopulations (it is very easy to construct AW-summaries that have zero variance on any one subpopulation but are very bad otherwise).

The average variance over subpopulations of certain weight or size was considered by M. Szededy and M. Thorup (ON THE VARIANCE OF SUBSET SUM ESTIMATION, In *Proc. 15th ESA*, LNCS 4698, pages 75-86, 2007), who showed that (for any subpopulations size), it is simply a linear combination of two quantities. The sum of per-key variances $$\sum V[A] \equiv \sum_{i \in I} VAR_A[i]$$

and the variance of the sum $$\sum V[A] \equiv \left[\sum_{i \in I} A(i)\right].$$

An AW-summary preserves total weight if $$\sum_{i \in I} A(i) = w(I)$$

(Therefore $V\Sigma[A]=0$ and is minimized.) The average variance, among AW-summaries that preserve total weight, is minimized when $\Sigma V[A]$ is minimized. For two total-preserving AW-summaries, A1 and A2 of the same weighted set, the ratio of the average variance over any subpopulation size is $\Sigma V[A_1]/\Sigma V[A_2]$.

In practice, average variance is an insufficient measure, as we need to be able to bound the variance on arbitrary subpopulations (avoid pathological cases) and obtain confidence intervals. Therefore, this metric is complemented by limiting the covariances structure so that the variance over subpopulations is more "balanced." An AW-summary A has non positive covariances if for every two keys $i \neq j$, $COV_A[i,j] \leq 0$ (equivalently, $E[A(i)A(j)] \leq w(i)w(j)$). We similarly consider zero covariances, if for every two keys $i \neq j$, $COV_A[i,j]=0$. A case for the combined properties of total preserving and non-positive covariances was made in E Cohen and H. Kaplan, TIGHTER ESTIMATION USING BOTTOM-K SKETCHES (In *Proceedings of the 34th VLDB Conference*, 2008).

Combining the above desirable properties, we say that an AW-summary is optimal if $\Sigma V$ is minimized, $V\Sigma=0$ (it is total preserving), it has non-positive covariances, and it has a fixed size. This combination of desirable properties dates back to A. B Sunter, List sequential sampling with equal or unequal probabilities without replacement (*Applied Statistics*, 26:261-268, 1977), but was first realized by E. Cohen, N. Duffield, H. Kaplan, C. Lund, and M. Thorup, VARIANCE OPTIMAL SAMPLING BASED ESTIMATION OF SUBSET SUMS, In *Proc. 20th ACM-SIAM Symposium on Discrete Algorithms*, ACM-SIAM, 2009.

All the AW-summarizations we propose and evaluate preserve total weight and have fixed size and non-positive covariances and thus same-size summaries can be conveniently compared using the one-dimensional metric $\Sigma V$.

An AW-summary has Horvitz-Thompson HT adjusted weights [see D. G. Horvitz and D. J. Thompson, A GENERALIZATION OF SAMPLING WITHOUT REPLACEMENT FROM A FINITE UNIVERSE, *Journal of the American Statistical Association*, 47(260):663-685, 1952], if a key i with weight w(i) is included in the summary with probability p(i), it is assigned an adjusted weight A(i)=w(i)/p(i). It is well known that the HT adjusted weights minimize the variance for each key, and therefore also minimize $\Sigma V$ for a given set of inclusion probabilities p(i),(i ∈ I). It is also well known that the inclusion probabilities that minimize $\Sigma V$ for a given average summary size are those where p(i) is proportional to w(i) (IPPS sampling, as described in S. Sampath, *Sampling Theory and Methods*, CRC Press, 2000, and R. Singh and N. S. Mangat, *Elements of survey sampling*, Springer-Verlag, New York, 1996). A recent result by the present inventors has established the existence of, and provided an efficient algorithm (VAROPT), as described in the references cited previously, for an optimal AW-summarization on aggregated data. In the present invention, where we deal with unaggregated data, we show no optimal summarization exists, but provide a near-optimal summarization algorithm for use on unaggregated data.

Summarization Algebra

The sum $w=w_1 \oplus w_2$ of two weight assignments $w_1$ and $w_2$ is a weight assignment defined by key-wise addition, $w(i)=w_1(i)+w_2(i)$ (i ∈ U).

For the sum (merge) of the corresponding weighted sets we use the notation $$(I_1, w_1) \oplus (I_2, w_2) = (I_1 \cup I_2, w_1 \oplus w_2).$$

The definition naturally applies to the sum $A_1 \oplus A_2$ of random weight assignments $A_1$ and $A_2$, (and in particular also to AW-summaries), and extends to the sum of multiple weight assignments $w_1 \oplus w_2 \oplus \ldots \oplus w_h = \oplus_{j=1}^{h} w_j$. Observe that the sum operation is commutative.

Some important properties, including being an AW-summary, are additive. Let $w_j (1 \leq j \leq h)$ be weight assignments with respective AW-summaries Aj. Let $W = \oplus_{j=1}^{h} w_j$. Then two lemmas follow:

LEMMA 1. The random weight assignment $A = \oplus_{j=1}^{h} A_j$ is an AW-summary of w.

LEMMA 2. If the AW-summaries Aj are independent, the covariances are additive. That is, $$COV_{\oplus_{l=1}^{h} A_l}[i, j] = \sum_{l=1}^{h} COV_{A_l}[i, j]$$

Proof of LEMMAS 1 and 2 is omitted from this specification for simplicity.

The sum of AW-summaries preserves the non-positive covariances and zero covariances properties:

COROLLARY 3. If the AW-summaries $A_j$ are independent, then if $A_j$ (j=1, ..., h) have the non positive covariances or the zero covariances properties then so does the AW-summary $\oplus_{j=1}^{h} A_j$. This follows because if all summands are zero or non-positive, so is their sum.

COROLLARY 4. If the AW-summaries $A_j$ are independent, then for each key $i \in U$, $$VAR_{\oplus_{j=1}^{h} A_j}[i] = \sum_{j=1}^{h} VAR_{A_j}[i]$$

COROLLARY 5. If the AW-summaries $A_j$ are independent, then $$\Sigma V\left[\bigoplus_{j=1}^{h} A_j\right] = \sum_{j=1}^{h} \Sigma V[A_j]$$

DEFINITION 6. An adjusted-weights summarization scheme (AW-summarization) $\mathfrak{R}$ is a mapping from a set of weight assignments to corresponding AW-summaries, that is, for a weight assignment w, $\mathfrak{R}(w)$ is an AW-summary of w.

If we can apply $\mathfrak{R}$ to a random weight assignment A, we use the notation $\mathfrak{R} \circ A \equiv \mathfrak{R}(A)$ We can now establish transitivity of AW-summary properties under the composition operation.

LEMMA 7. Let A be an AW-summary, and let $\mathfrak{R}$ be an AW-summarization defined over the range of A. (We define the range of a probability distribution to be all points with positive probability (or positive probability density).) Then:

(i) $E[(\mathfrak{R}(w))(i)] = w(i)$ ($i \in U$)

(ii) $\mathfrak{R} \circ A$ is an AW-summary of w.

The composition $\mathfrak{R}_1 \circ \mathfrak{R}_2 \circ \ldots \circ \mathfrak{R}$ (the domains must be compatible for this to be defined) of several AW-summarizations is also an AW-summarization.

Suppose A, B are AW-summaries of w with the property that $E[B(i)|A] = A(i)$ for all $i \in U$. Then $COV_B[i, j|A]$ will denote the conditional covariance of B(i), B(j), i.e., conditioned on A. Set $VAR_B[i|A] = COV_B[i, i|A]$. The following is a Law of Total (co)Variance for the present model.

LEMMA 8. For each pair of keys $i, j \in U$, $$CO V_{\mathfrak{R} \circ A}[i,j] = E[CO V_{\mathfrak{R} \circ A}[i,j|A]] + COV_A[i,j]$$

COROLLARY 9. For each key $I \in U$, $$VA R_{\mathfrak{R} \circ A}[i] = VAR_A[i] + E[VA R_{\mathfrak{R} \circ A}[i|A]]$$

In particular, we have, in an obvious notation, $\Sigma V[\mathfrak{R} \circ A] = \Sigma V[A] + E[\Sigma V[\mathfrak{R} \circ A|A]]$.

LEMMA 10. If the AW-summaries A and the range of $\mathfrak{R}$ preserve total weight, have the zero covariances property, or have the non positive covariances property, then so does the AW-summary $\mathfrak{R} \circ A$. (The proof follows directly from LEMMA 8.)

Summarization in an Information Flow Tree

As described above with reference to FIG. 1, in an IFT the output of each node is a weighted set that corresponds to an AW-summary of the data points below it. The input of each node is the unaggregated data set that corresponds to the union of the outputs of its children. For a fixed input, the output is an AW-summary of the sum of the weighted sets obtained from its children.

The internal summarization at each node can be performed by first adding (merging) the weighted sets collected from is children and then applying an AW-summarization to the merged set that reduces it as needed to satisfy the capacity constraint on the edge directed to its parent. There may be internal IFT constraints at the node, however, that do not allow for efficiently merging the input sets: We may want to speed up the summarization process by partitioning the input among multiple processors, or the data may be stored in external memory, and at the extreme, if internal memory only suffices to store the output summary size, it may be preferable to process the concatenated inputs as an unaggregated stream.

The additivity and transitivity properties of AW-summaries guarantee that if each basic summarization step at and below a node utilizes total-preserving and non-positive covariances AW-summarization, then the output of the node is also a total preserving and non-positive covariances AW-summary.

Note that for this property to hold, the IFT structure does not have to be fixed. The IFT nodes represent operations on the data. The next operation (in the structure above the node) can depend on the output and the operation itself can depend on the input data points. For a certain data set, we can consider a family of such recursive IFTs (which allow, for example, for different arrival orders of data points or for variable size streams).

In the summarization of an unaggregated data stream, a fixed-size summary S of size k is propagated from child to parent. Each parent node adds the new single data point (i', w') to the summary to obtain $S' = S \oplus \{(\{i'\}, w')\}$. If S' contains k+1 distinct items (that is, the key i' does not appear in S), we apply an AW-summarization that reduces the summary from size k+1 back to size k.

The basic building block of data stream summarization is an AW-summarization that inputs a weighted set of size k+1 and outputs a weighted set of size k (removes a single key).

Interestingly, any AW-summary that produces a size k AW-summary from a size k+1 weighted set using HT adjusted weights has the non-positive covariances property:

LEMMA 11. Consider an AW-summarization that for an input weighted set of size k+1 produces summaries of fixed size k, (for inputs that are already of size k, it return the input set) and uses the HT adjusted weights. This AW-summarization has non positive covariances.

Interestingly, there is a unique such AW-summarization that is also total-preserving and minimizes $\Sigma V$, which means it is locally optimal for this primitive. The scheme is L-VAROPT$_k$ (local application of VAROPT). We refer to an application of our summarization algebra on an unaggregated stream in conjunction with the L-VAROPT$_k$ primitive as SA-STREAM-VOPT$_k$.

When the IFT constraints allow, instead of adding one data point at time we can consider a sequence of batch additions (merges) of sets of data points followed by summarizations. The motivation for batch additions before summarizing is that we extend the local optimality (minimal $\Sigma V$) from being per data-point to being per batch. Formally, for a weighted set (J,A)(representing current summary) and data points $(i_1, w_1), \ldots, (i_r, w_r)$ $$\Sigma V\left[VAROPT_k(J, A) \oplus \bigoplus_{j=1}^{r}\{(i_r, w_r)\}\right] \leq$$

$$\Sigma V[L\text{-}VAROPT_k(\ldots (L\text{-}VAROPT_k((J, A) \oplus \{(i_1, w_1)\}) \oplus \{(i_2, w_2)\})$$

$$\ldots \oplus \{(i_r, w_r)\})]$$

The left hand side, by optimality of $VAROPT_k$, is the minimum $\Sigma V$ for size-k AW-summaries of the weighted set $(J, A) \oplus \bigoplus_{j=1}^{r}\{(i_r, w_r)\}$. The right hand side is another AW-summary of this weighted set. Concretely, consider a node that obtains multiple size-k summaries from its children, can internally store size k' summary in memory (k'≧k), and outputs a size k summary. If the number of distinct keys is at most k', we should merge the input summaries before summarizing them to size k. If k'=k, we apply SA-STREAM-VOPT$_k$ on the concatenation of the inputs. Otherwise, we add data points until we have k' distinct keys (this is effectively a partial merge), apply SA-STREAM-VOPT$_{k'}$ to the remaining data points, and apply $VAROPT_k$ to the result.

We refer to the generic application of our summarization algebra (arbitrary addition and summarization steps) with L-VAROPT as the summarization primitive as SA+VOPT. If the data happen to be aggregated and all intermediate summarizations allow summary size that is at least the output size, then SA+VOPT is an instance of VAROPT. Therefore, by leveraging VAROPT as a building block, $\Sigma V$ gracefully converges to the optimal when the data is more aggregated and attains it if the data set happens to be aggregated.

As typical for "online" problems, we can show that there is no IFT-constrained summarization algorithm of unaggregated data sets that minimizes $\Sigma V$. This is in contrast to aggregated data sets (where VAROPT minimizes $\Sigma V$).

THEOREM 12. There is no AW-summarization algorithm for unaggregated streams that produces a fixed-size summary that minimizes $\Sigma V$. (Proof omitted.)

Given Theorem 12, it is not very surprising that we could construct an example where SA-STREAM-VOPT has a slightly larger $\Sigma V$ than ASH: consider a sequence of 7 packets $p_1, \ldots, p_7$ where packets $p_1, p_2$ belong to flow $f_1$, packets $p_3$, $p_4$ to $f_2$ and packets $p_5, p_6, p_7$ to $f_3$. $\Sigma V$ of VAROPT on this sequence is 8.4 and $\Sigma V$ of ASH is 8.05. The optimal aggregated VAROPT has $\Sigma V$ of 7.5 on this distribution. On the other hand, we constructed a family of unaggregated streams where ASH has larger $\Sigma V$ by a logarithmic (in k) factor.

We conclude the theoretical discussion with a conjecture. We define the competitive ratio of an AW-summarization as the worst-case ratio (over all applicable unaggregated inputs data sets) between $\Sigma V$ and the minimum possible $\Sigma V$ on the corresponding aggregated data for summary of the same size. The competitive ratio of ASH is at least log k whereas the worst example we could find for SA-STREAM-VOPT$_k$ (on a contrived family of sequences) was about 1.6. We conjecture that SA-STREAM-VOPT$_k$ advantageously has a small constant competitive ratio.

When considering SA+VOPT on a data set and corresponding family of IFTs, we define k' to be the smallest size of an intermediate summary on which L-VAROPT is applied (that is, the smallest i such that L-VAROPT$_i$ is used). We conjecture that the ratio of $\Sigma V$ to $\Sigma V$ [VAROPT$_{k'}$] is bounded by a constant. In practice SA+VOPT is very close to optimal and outperforms all other algorithms.

Figure 4:
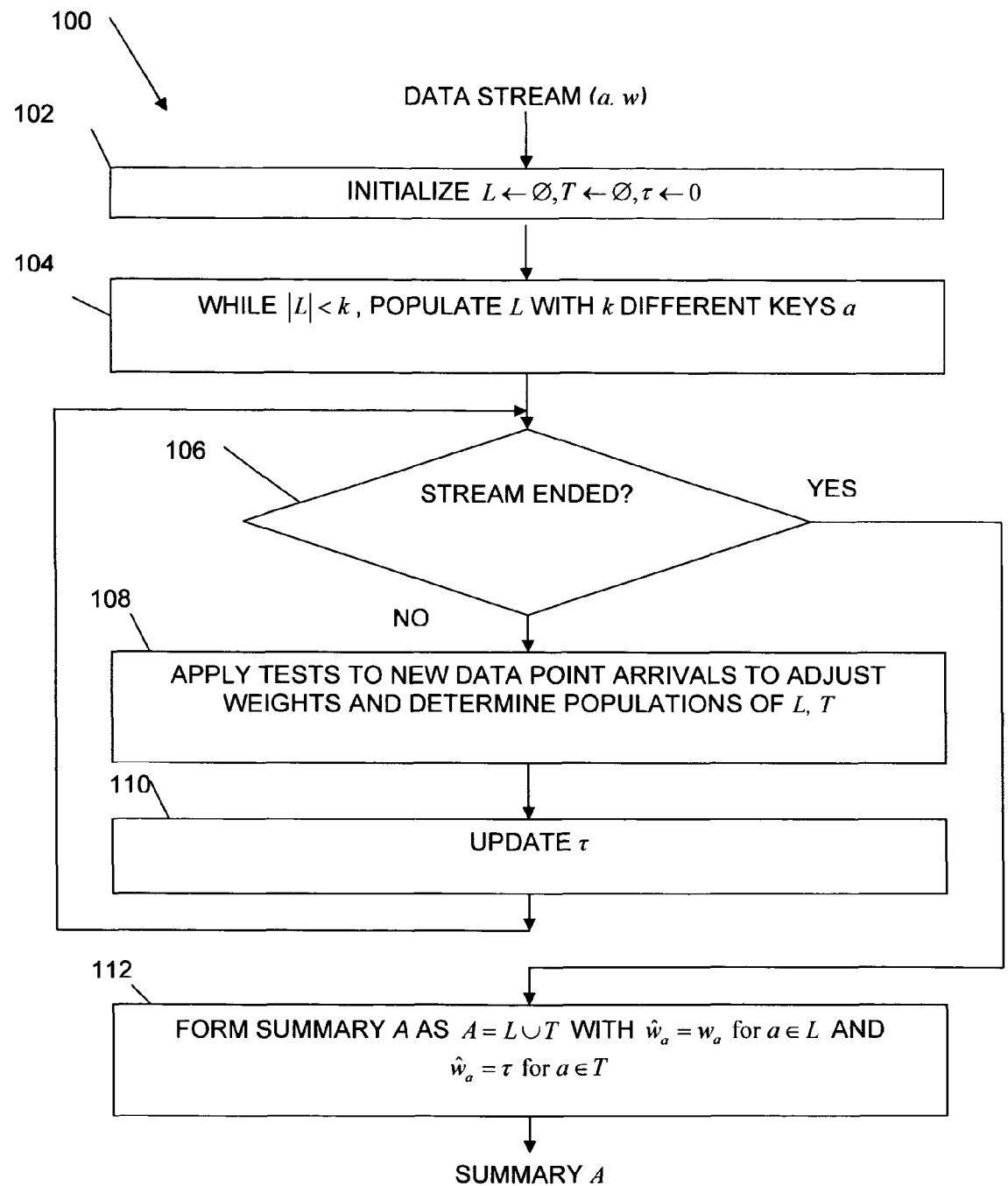
FIG. 4 is a flowchart showing a summarization method performed according to the invention.

FIG. 4 is a flowchart showing a method 100 according to the invention. It is possible to implement SA+VOPT with repetitive additions (merges) of data, however, this naïve implementation of SA+VOPT is inefficient: If the output weighted set of each application of L-VAROPT is transferred as a list, then each L-VAROPT$_k$ application performed after addition of data points requires 0(k) processing time. Similarly, without tuned data structures, the processing time of a merge (adding sets) depends on the sum of the sizes of the sets.

Accordingly, in order to provide improved processing, the present invention is implemented in method 100, which maintains the summary in a tuned data structure that reduces worst-case per-data point processing to amortized 0(log k). The implementation is fast and further benefits from the fact that the theoretical amortized 0(log k) bound applies to worst-case distributions and arrangements of the data points. Performance on "real" sequences is closer to 0(1) time per data point and holds for randomly permuted data points.

In method 100, the input is an unaggregated stream of data points (a, w) where a is a key and w is a positive weight. The output is a summary A which is a sample of up to k keys. Each included key a has an adjusted weight $\hat{w}_a$. If a key is not in A its adjusted weight is 0. Method 100 proceeds using the summarization algebra described above, and thus the summary A has the advantageous properties that accompany its use.

In method 100, a threshold $\tau$, initially set to 0, is calculated. The keys in A are partitioned into two sets or reservoirs L and T, each initially empty and populated with keys a in the data stream with adjusted weights $\hat{w}_a$ as will be described below. In accordance with method 100, each $a \in L$ has a weight $w_a \geqq \tau$. The set L is stored in a priority queue which always identifies the key with the smallest weight $\min_{a \in L} w_a$. As will be described below, when a new data point arrives, a determination is made whether to move the key with the smallest weight from set L. Each $a \in T$ has a weight $w_a \leqq \tau$. The set T is stored as a prefix of an array of size k+1. For every $a \in A$, the adjusted weight is $\hat{w}_a = \max\{\tau, w_a\}$. Thus $\hat{w}_a = w_a$ for $a \in L$ while $\hat{w}_a = \tau$ for $a \in T$.

Referring to FIG. 4, in step 102 the sets L and T and threshold $\tau$ are initialized. The threshold $\tau$ is set to 0, and sets L and T are initially empty sets. I.e., L←∅, T←∅, $\tau$←0.

Figure 5:
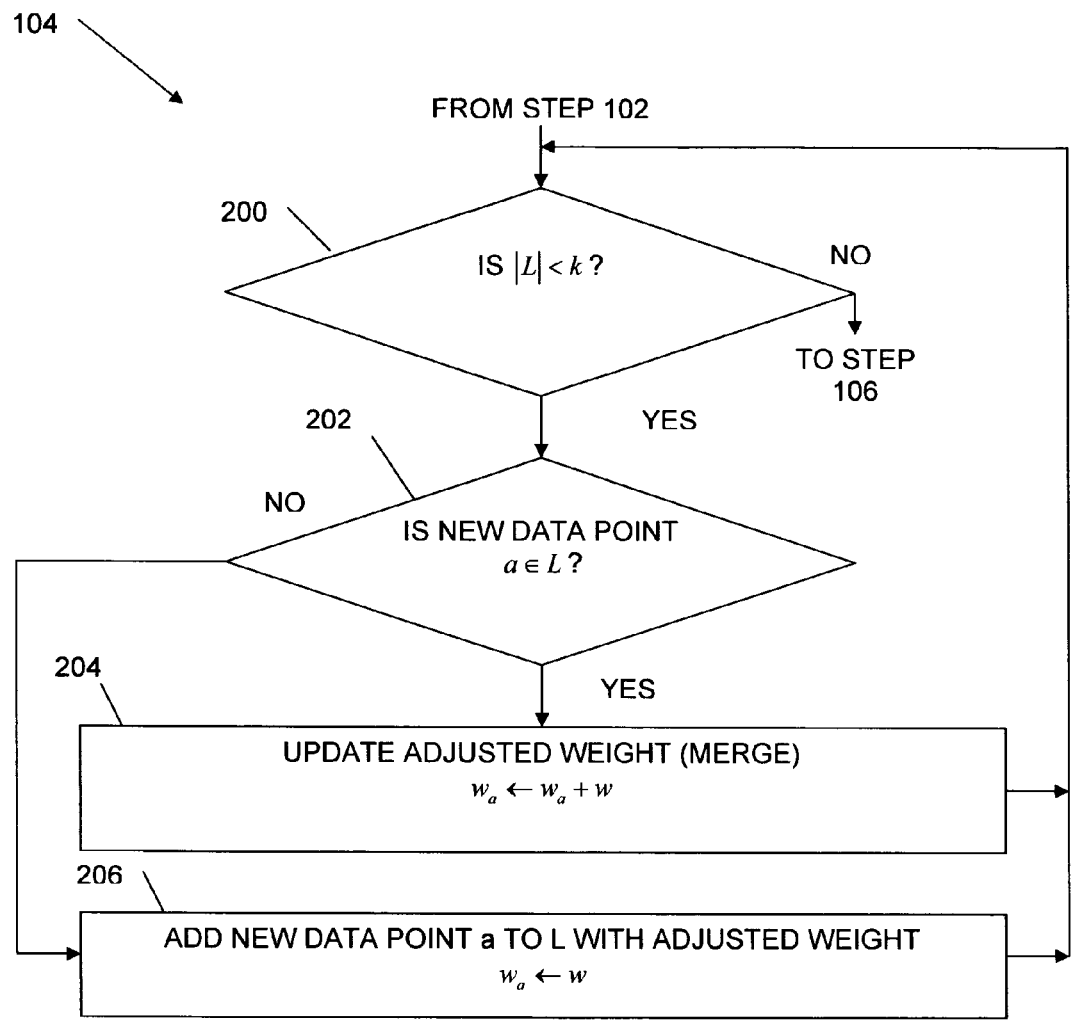
FIGS. 5-8 are flowcharts showing in greater detail certain aspects of the method according to the invention.

In step 104, the set or reservoir L is populated with arriving data points until it contains k different keys. FIG. 5 shows the operation of step 104 in greater detail. As shown in FIG. 5, in step 200 a test is performed to determine if the number of keys in L is <k. If so, in step 202 a determination is made whether the key of the new data point is already in L ($a \in L$?). If so, in step 204 the weight w of the new data point is merged with the existing adjusted weight $w_a$ of the existing key to update the adjusted weight ($w_a \leftarrow w_a + w$). If not, in step 206 the new data point is added to L and its adjusted weight (previously 0) is increased by w. Upon completion of step 204 or 206, the method returns to step 200 to determine if set L is populated with k keys. If it is, the method proceeds to step 106 of FIG. 4.

Returning to FIG. 4, once set L is populated, in step 106 a determination is made whether the stream has ended (which may be determined by a further test, for example one based on elapsed time if the summary A is to be provided on an hourly or daily basis).

If step 106 determines that the data stream has not ended, in step 108 new data point arrivals (the k+1 data points) are tested to determine whether their keys and weights are to be included in sets L or T, and whether other keys and weights are to be moved or removed in order to provide a sample with just k keys. The tests of step 108 are shown in greater detail in FIG. 6, to be described below. After the tests of step 108 are performed, in step 110 the threshold τ is updated and the method returns to step 106 to determine if the data stream has ended. If the stream has ended, in step 112 the existing contents of sets L and T are merged to form the summary A, with adjusted weights given by $\hat{w}_a = w_a$ for a ∈ L and $\hat{w}_a = τ$ for a ∈ T. The output of the method 100 is summary A with these adjusted weights.

Figure 6:
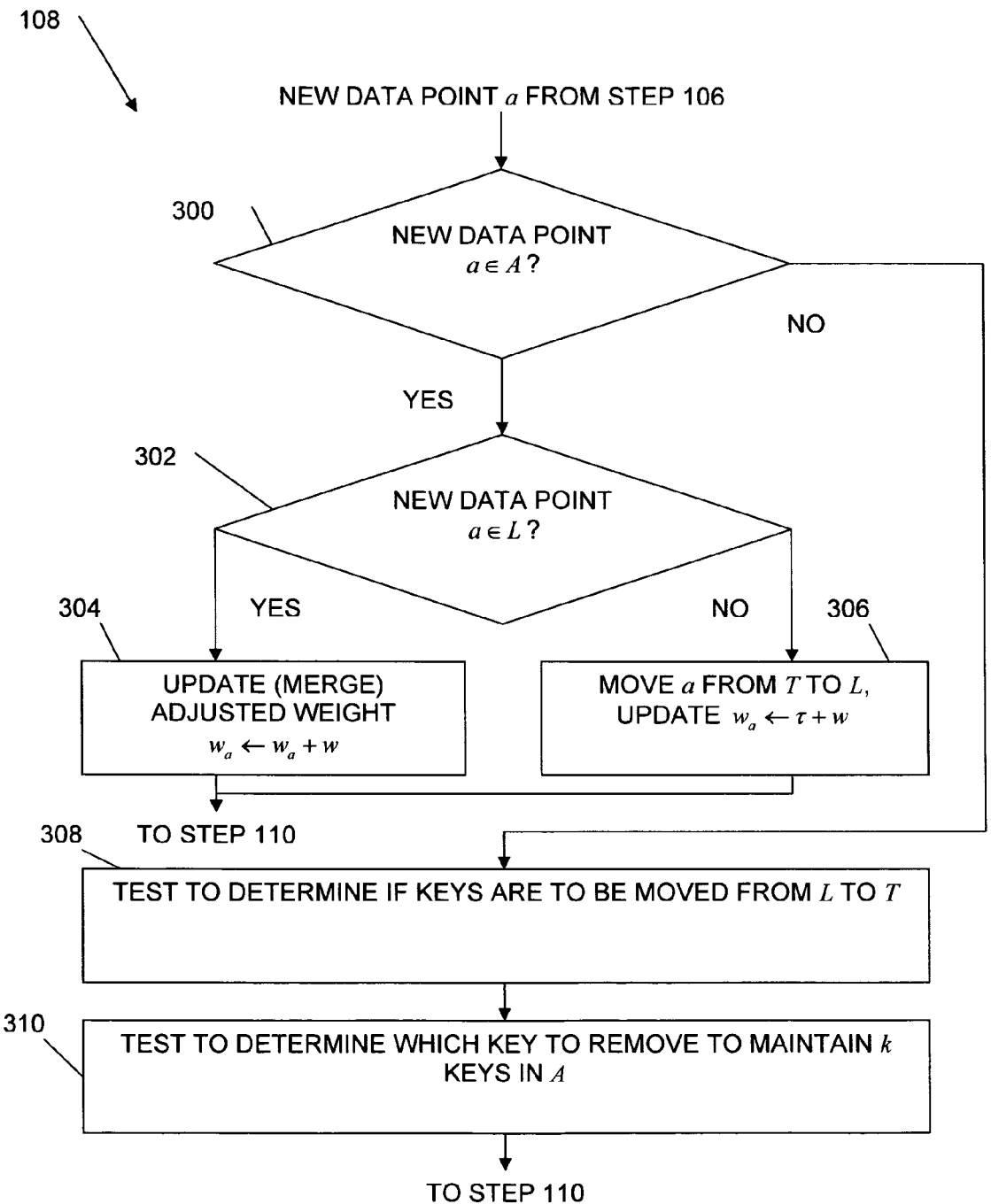

Referring now to FIG. 6, the tests performed by step 108 are shown. In step 300 a determination is made whether the new data point a is already in summary A, and if so, in step 302 a determination is made whether the new data point a is in L. If it is already in L then in step 304 the adjusted weight of a is updated by merging the weight w of the new data point with the existing adjusted weight of that key in L. If step 302 determines that the new data point a is not in L (which means it is in T because step 300 has determined that it is in A), then in step 306 the key a is moved from set T to set L, and it is given an adjusted weight of $w_a \leftarrow τ + w$ in set L. It will be observed that because the key of the new data point is already in A, the steps 302-306 maintain the number of keys in A at k.

If step 300 determines that the new data point is not in A, then the method proceeds to step 308 to apply a test to determine if keys with low adjusted weights in L are to be moved to T, and then to step 310 to apply a test to determine which key to remove to maintain the number of keys in A at k. The method then returns to the threshold updating step 110 in FIG. 4.

Figure 7:
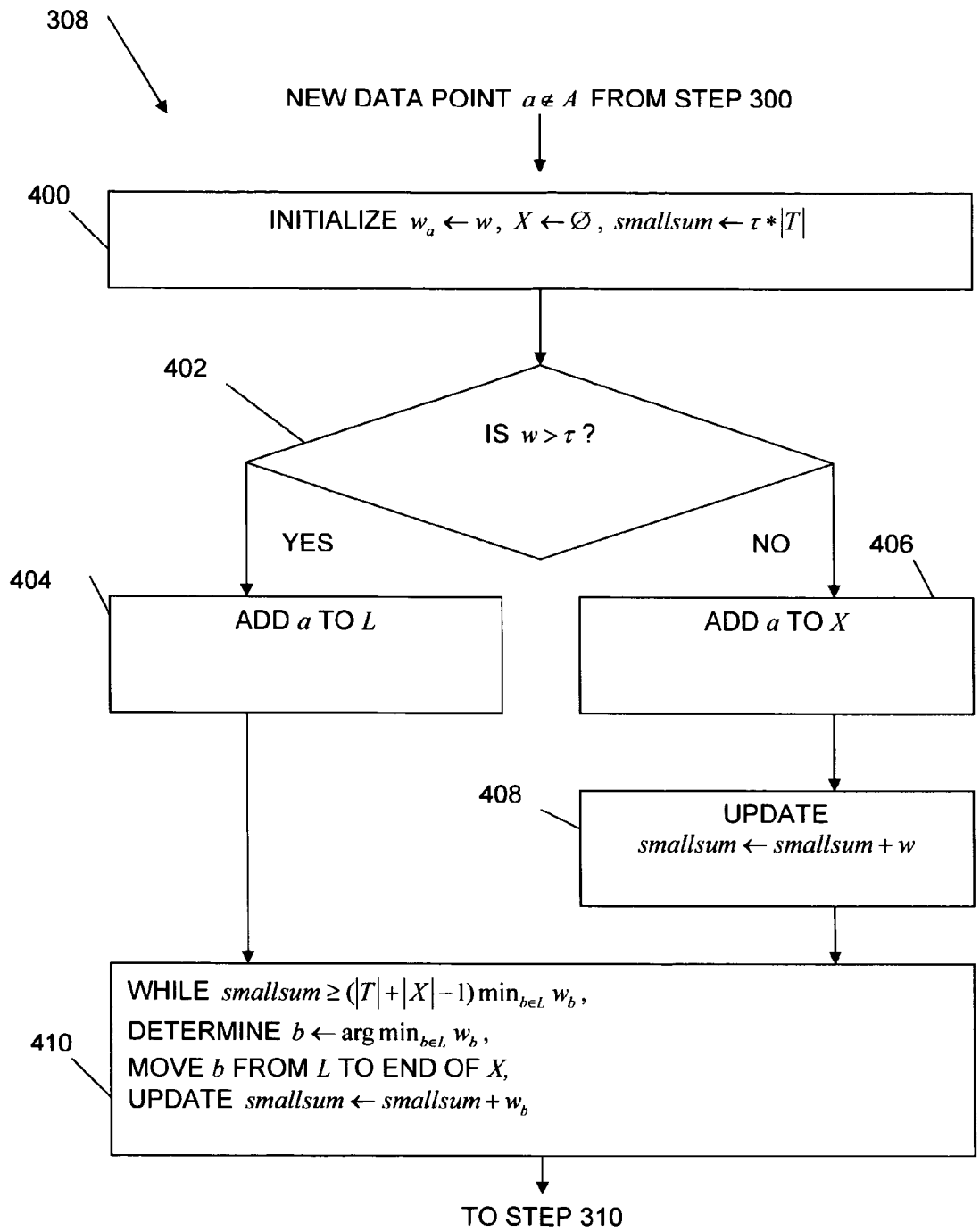
Figure 8:
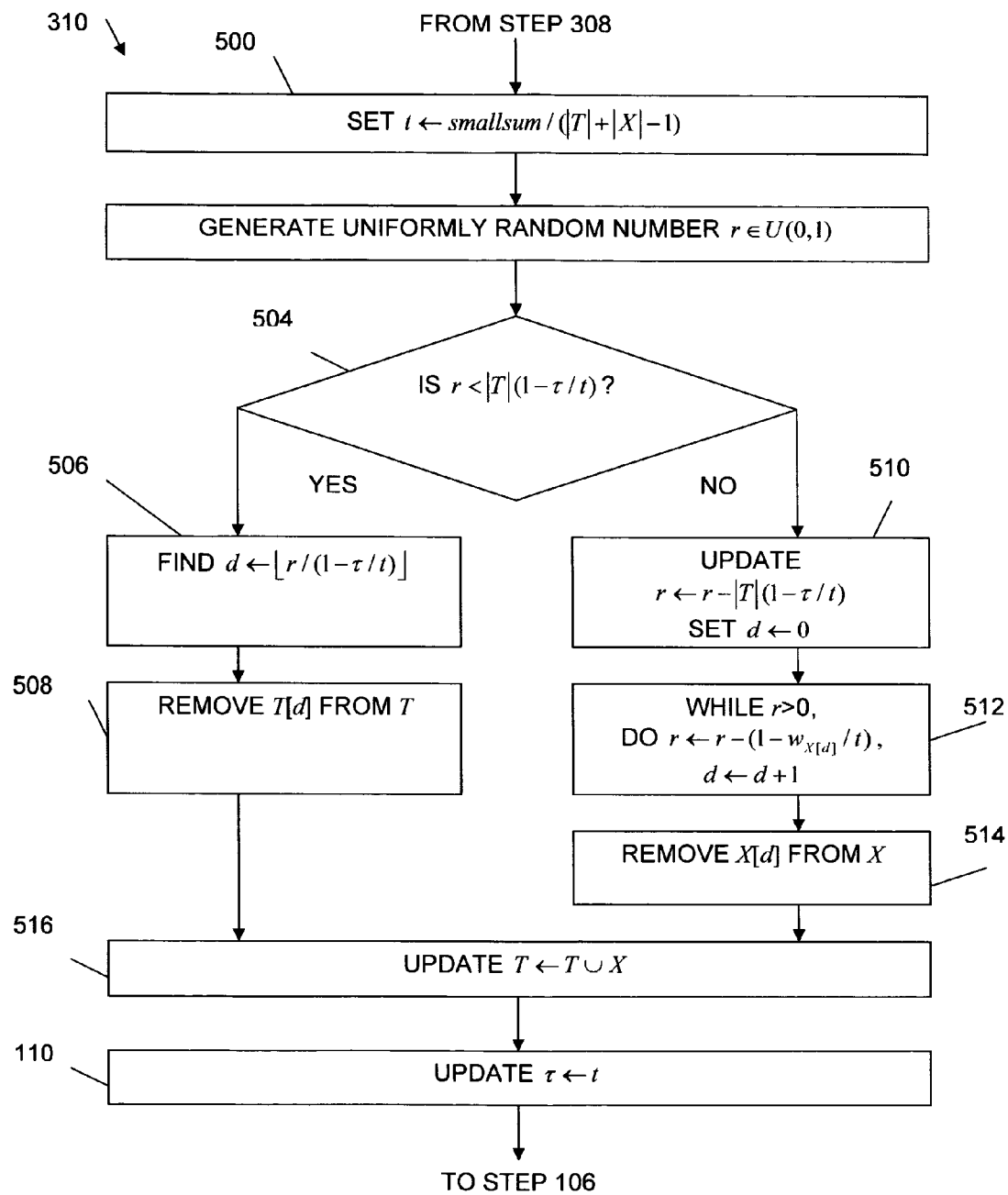

Step 308 is shown in greater detail in FIG. 7, and step 310 in FIG. 8.

Referring to FIG. 7, step 308 receives a new data point that is not in A. In step 400, initial values are created for adjusted weight $w_a \leftarrow w$, for a new temporary reservoir or set X that is initially empty, and for a new variable smallsum←τ*|T|. Smallsum thus initially represents the total weight of keys in T. In step 402 a determination is made whether the weight of the new data point exceeds the threshold, i.e., w>τ, and if so in step 404 the new data point a is added to L with adjusted weight $w_a$. If not, in step 406 the new data point a is added to the temporary reservoir X, and step 408 updates the variable smallsum←smallsum+w.

Steps 404 and 408 then proceed to step 410, which determines if smallsum≧(|T|+|X|−1)$\min_{b \in L} w_b$, and if so proceeds to find the key b in L with minimum weight, i.e., b←arg $\min_{b \in L} w_b$, and moves b from L to the end of X. As mentioned previously, set L is preferably stored as a priority queue, identifying the minimum weight key b, so that the steps for locating and moving it are simplified. Set X is also preferably stored as a priority queue to facilitate random selection of a key to remove. Step 410 then updates smallsum←smallsum+$w_b$, and returns to the beginning of step 410 to determine if a new minimum adjusted weight member of L should be moved to X.

At the conclusion of step 410, one or more low adjusted weight keys in L will have been moved to the temporary reservoir X, and the method then proceeds to step 310 to determine which key to remove from T or X to maintain the number of keys in summary A at k.

Step 310 is shown in FIG. 8. The input to step 310 includes the updated set X and updated variable smallsum generated in step 308. In step 500 shown in FIG. 8, a variable t is set as t←smallsum/(|T|+|X|−1). In step 502, a random number r is generated, r ∈ U(0,1). Then in step 504 it is determined whether r<|T|(1−τ/t), and if so, in step 506 the random number r is used to find d in T such that dΔ[r/(1−τ/t)]. In step 508, T[d] is removed from T, and the total number of keys in summary A remains at k.

If step 504 determines that it is not true that r<|T|(1−τ/t), then in step 510 r is updated as r←r−|T|(1−τ/t), and d is set as d←0. Then in step 512, while r>0, an X[d] is found such that rΔr−(1−$w_{X[d]}$/t), then d is updated as d←d+1, and in step 514 X[d] is removed from X, and the number of keys in summary A remains at k.

The removal of a key from T in step 508 or the removal of a key from X in step 514 result from a random selection process of the keys in T or X, which by reason of their selection for placement in these sets have adjusted weights below the threshold τ, and thus their removal does not influence the more significant weights of keys included in L. The selection process is consistent with the HT conditions and preserves the quality of the sample A.

After keys are removed from T in step 508 or from X in step 514, the method proceeds to step 516, where T is updated as T←T∪X. At this point step 310 is completed, and the method proceeds to step 110 of FIG. 4. Step 110 is also shown in FIG. 8, because the updating which takes place in step 110 uses items generated in step 310, namely, step 110 updates τ←t, where t is as given in step 500. After τ is updated, the method returns to step 106 in FIG. 4 to repeat the processing of new data points until the data stream ends.

The method described above for summarizing unaggregated data in a stream has been evaluated in comparison to other previously-known methods and the results have shown the method of the invention to provide improved results with lower variance providing tighter estimates than prior methods and indeed performs very closely to the unattainable optimum available with aggregated data.

Thus, the invention describes a feature enabling unaggregated data to be summarized in situations where processing resources (storage, memory, time) are constrained. While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation to the teachings of the invention without departing from the scope thereof. Therefore, it is intended that the invention not be limited to the particular embodiments disclosed, but that the invention include all embodiments falling within the scope of the appended claims.

What is claimed is:

1. A method for producing a summary A of data points in an unaggregated data stream wherein the data points are in the form of weighted keys (a, w) where a is a key and w is a weight, and the summary is a sample of k keys a with adjusted weights $w_a$, where k is a finite integer, comprising:
    a. forming a first reservoir L and a second reservoir T which are initially empty;
    b. providing a threshold τ whose initial value is zero;
    c. merging data points in the stream into the reservoir L until the reservoir L contains k keys by examining each new data point and if the key a of that data point is not already in reservoir L, then adding it to reservoir L, and if the key a of that data point is already in reservoir L, then updating the adjusted weight for that key to $w_a \leftarrow w_a + w$;
    d. storing the keys in reservoir L in a priority queue which identifies the key b with the minimum adjusted weight of the keys in reservoir L[arg $\min_{b \in L}, w_b$];

e. examining the next data point and
   if its key a is already in the reservoir L, then adding its weight to the adjusted weight of the key in the reservoir, and
   if its key a is already in the reservoir T, then updating its adjusted weight to $w_a \leftarrow \tau+w$ and moving the key a from reservoir T to reservoir L; and
   if its key a is not already in the reservoir L or in the reservoir T, then performing the following steps:
   (1). updating the adjusted weight of the key a to $w_a \leftarrow w$;
   (2). forming a third reservoir X which is initially empty;
   (3). creating a variable smallsum and updating it with the value smallsum$\leftarrow \tau$*|T|,where |T |is the number of keys in reservoir T;
   (4). if $w > \tau$, then add a to reservoir L; otherwise add a to reservoir X and update smallsum$\leftarrow$smallsum+w;
   (5). while smallsum$\geq$(|T|+|X|−1)$\min_{b \in L} w_b$ , then do the following: find the key b such that b$\leftarrow$arg $\min_{b \in L} w_b$, move b from L to the end of X, and update smallsum$\leftarrow$smallsum+$w_b$;
   (6). create a variable t with the value t$\leftarrow$smallsum /(|T|+|X|−1);
   (7). generate a uniformly random number r $\in \cup(0,1)$;
   (8). if $r < |T|(1-\tau/t)$, then determine a value d such that d$\leftarrow \lfloor r/(1-\tau/ t) \rfloor$ and remove T[d] from T; otherwise update r $\leftarrow r-|T|(1-\tau/ t)$, set d$\leftarrow$0 and while r>0, update r$\leftarrow r-(1-w_{x[d]}/t)$, update d$\leftarrow$d+1, and remove X[d] from X;
   (9). update $\tau \leftarrow t$;
   (10). update T$\leftarrow$T$\cup$X;
f. repeating steps d and e until the data stream desired to be summarized ends; and
g. providing the summary A of data points as A=L$\cup$T, with the keys included in L and T being assigned adjusted weights $\hat{w}_a = w_a$ if a $\in$L and $\hat{w}_a = \tau$ if a $\in$ and all keys not in A being assigned adjusted weights of zero.

2. A method for producing a summary A of data points in an unaggregated data stream wherein the data points are in the form of weighted keys (a, w) where a is a key and w is a weight, and the summary is a sample of k keys a with adjusted weights $w_a$, where k is a finite integer, comprising:
a. providing a first reservoir L with keys having adjusted weights which are additions of weights of individual data points of included keys;
b. providing a second reservoir T with keys having adjusted weights which are each equal to a threshold value $\tau$ whose value is adjusted based upon tests of new data points arriving in the data stream;
c. combining the keys and adjusted weights of the first reservoir L with the keys and adjusted weights of the second reservoir T to form the summary representing the data stream;
d. providing a third reservoir X for temporarily holding keys moved from reservoir L and for temporarily holding keys to be moved to reservoir T in response to tests applied to new data points arriving in the stream;
e. merging new data points in the stream into the reservoir L until the reservoir L contains k different keys;
f. thereafter applying a series of tests to new arriving data points to determine how their keys and weights affect the keys and adjusted weights to be included in the summary, such tests including
   1. a first test to determine if the key of the new data point is already included in reservoir L, and if so, to increase the adjusted weight of the included key by the weight of the new data point;
   2. a second test to determine if the key of the new data point is already included in reservoir T, and if so, to move the key from reservoir T to reservoir L and to increase the adjusted weight of the included key by the weight of the new data point;
   3. if the key of the new data point is not already in included in reservoir T or reservoir L, a third test to determine if the weight of the new data point is greater than the threshold value $\tau$ and if so, to add the key and weight of the new data point to reservoir L, and if not to add the key of the new data point to reservoir X;
   4. a fourth test to determine if the key with the minimum adjusted weight included in reservoir L is to be moved to reservoir X;
   5. a fifth test based on a randomly generated number to determine keys to be removed from reservoirs T or X;
g. updating the threshold value $\tau$ based on the keys and weights in reservoirs T and X;
h. combining the remaining keys in reservoir X with the keys in reservoir T to form an updated reservoir T with updated adjusted weights $\tau$ to be combined with the keys and adjusted weights in reservoir L to form the summary sample A.

3. A method as claimed in claim 2 wherein the fourth test to determine if the key with the minimum adjusted weight included in reservoir L is to be moved to reservoir X comprises:
comparing the minimum adjusted weight included in reservoir L with an averaged weight of keys included in reservoirs T and X, and if the minimum adjusted weight is lower, moving the key with the minimum adjusted weight to reservoir X.

4. A method as claimed in claim 2 wherein the fifth test based on a randomly generated number to determine keys to be removed from reservoirs T or X comprises:
calculating a number t that is the sum of the weights of the keys in T plus the weights of data points added to X divided by the number of keys in T and X less 1;
generating a random number r $\in \cup(0,1)$;
determining if $r < |T|(1-\tau/t)$ , and if so calculating a value d such that d$\leftarrow \lfloor r/(1-\tau/ t) \rfloor$ and removing T[d] from T;
otherwise updating r$\leftarrow r-|T|(1-\tau/t)$, setting d$\leftarrow$0 and while r >0, updating r$\leftarrow r-(1-w_{x[d]}/t)$, updating d$\leftarrow$d+1, and removing X[d] from X.

5. A method as claimed in claim 2 wherein the step of updating the threshold value $\tau$ based on the keys and weights in reservoirs T and X comprises:
calculating a number t that is the sum of the weights of the keys in T plus the weights of data points added to X as a result of the third and fourth tests divided by the number of keys in T and X less 1;
updating the threshold value $\tau$ with the number t.

6. A method for producing a summary A of data points in an unaggregated data stream wherein the data points are in the form of weighted keys (a, w) where a is a key and w is a weight, and the summary is a sample of k keys a with adjusted weights $w_a$, where k is a finite integer, comprising:
a. providing a first reservoir L with keys having adjusted weights which are additions of weights of individual data points of included keys;
b. providing a second reservoir T with keys having adjusted weights which are each equal to a threshold value $\tau$ whose value is adjusted based upon tests of new data points arriving in the data stream;
c. merging new data points in the stream into the reservoir L until the reservoir L contains k different keys;

d. thereafter applying a series of tests to new arriving data points to determine how their keys and weights affect the keys and adjusted weights included in the reservoirs L and T, such tests including
   1. a first test to determine if the key of the new data point is already included in reservoir L, and if so, to increase the adjusted weight of the included key by the weight of the new data point;
   2. a second test to determine if the key of the new data point is already included in reservoir T, and if so, to move the key from reservoir T to reservoir L and to increase the adjusted weight of the included key by the weight of the new data point;
   3. if the key of the new data point is not already in included in reservoir T or reservoir L, a third test to determine whether the new data point is to be added to reservoir L, whether the key with the minimum adjusted weight included in reservoir L is to be removed and whether keys are to be removed from or added to reservoir T;
e. updating the threshold value τ based on the keys and weights in reservoir T and in new data points; and
f. combining the keys and adjusted weights of the first reservoir L with the keys and adjusted weights of the second reservoir T to form the summary A representing the data stream.

7. A method as claimed in claim 6 wherein the third test comprises a test to determine if the weight of the new data point is greater than the threshold value τ and if so, to add the key and weight of the new data point to reservoir L, and if not to add the key of the new data point to a temporary reservoir X.

8. A method as claimed in claim 7 wherein the third test further comprises a test to determine if the key with the minimum adjusted weight included in reservoir L is to be moved to reservoir X.

9. A method as claimed in claim 8 wherein the test to determine if the key with the minimum adjusted weight included in reservoir L is to be moved to reservoir X comprises:
   comparing the minimum adjusted weight included in reservoir L with an averaged weight of keys included in reservoirs T and X, and if the minimum adjusted weight is lower, moving the key with the minimum adjusted weight to reservoir X.

10. A method as claimed in claim 7 wherein the third test further comprises a test to determine keys to be removed from reservoirs T or X comprising:
   calculating a number t that is the sum of the weights of the keys in T plus the weights of data points added to X divided by the number of keys in T and X less 1;
   generating a random number $r \in \cup(0,1)$;
   determining if $r < |T|(1-\tau/t)$, and if so calculating a value d such that $d \leftarrow \lfloor r/(1/t) \rfloor$ and removing T[d] from T;
   otherwise updating $r \leftarrow r |T|(1-\tau/t)$, setting $d \leftarrow 0$ and while $r > 0$, updating $r \leftarrow r-(1-w_{x[d]}/t)$, updating $d \leftarrow d+1$ and removing X[d] from X.

11. A method as claimed in claim 6 wherein the step of updating the threshold value τ based on the keys and weights in reservoirs in reservoir T and in new data points comprises:
   calculating a number t that is the sum of the weights of the keys in T plus the weights of data points added to a temporary reservoir X divided by the number of keys in T and X less 1;
   updating the threshold value τ with the number t.

12. A method as claimed in claim 6 further comprising generating a second summary A' using the steps a-f, and merging the summary A with the summary A' by
   starting with the reservoirs L and T of summary A, and
   treating the keys and weights of reservoirs L' and T' of summary A' as new arriving data points; and
   applying the steps d-f to such new data points to produce a summary of the summaries A and A'.

13. A method as claimed in claim 6 further comprising:
   applying the steps a-f to a second data stream to produce a summary A' of the second data stream; and
   applying the steps a-f to the data points in the summary A and the summary A' to produce a third summary which summarizes the summary A and the summary A'.

14. A method as claimed in claim 13 wherein a first server provides the summary A and a second server provides the summary A' and a third server provides the third summary.

* * * * *